United States Patent Office 3,433,597
Patented Mar. 18, 1969

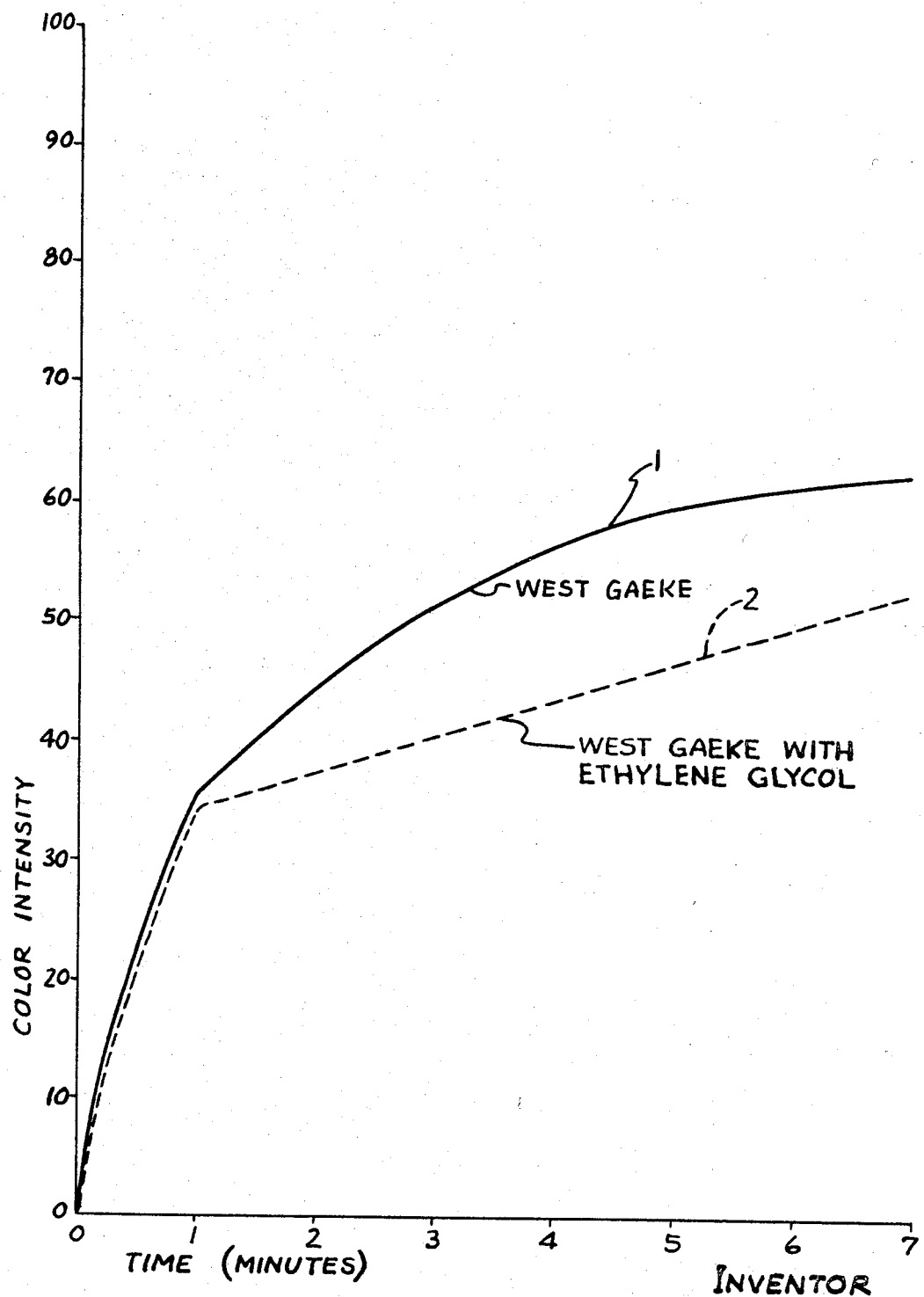

3,433,597
COLORIMETRIC REAGENT FOR ANALYSIS OF
SULFUR DIOXIDE IN AIR
Norman A. Lyshkow, Chicago, Ill., assignor to Precision
Scientific Company, Chicago, Ill., a corporation of
Delaware
Filed June 21, 1965, Ser. No. 465,300
U.S. Cl. 23—232          9 Claims
Int. Cl. G01n 31/22, 31/00

ABSTRACT OF THE DISCLOSURE

A colorimetric reagent for detecting sulfur dioxide in air including concentrated hydrochloric acid as the bleaching agent, p-rosaniline hydrochloride as the dyestuff, formaldehyde and ethylene glycol.

---

The present invention relates generally to colorimetric reagents and, more particularly, to an improved colorimetric reagent for the analysis of sulfur dioxide in air.

The use of colorimetric reagents for the analysis of sulfur dioxide in air has been proposed heretofore. Thus, the well-known West-Gaeke reagent has been used to detect sulfur dioxide by removing the sulfur dioxide from an atmosphere sample by scrubbing the sample with sodium tetrachloromercurate (II) to form a sample solution, and then adding a reagent of hydrochloric acid-bleached pararosaniline hydrochloride and formaldehyde to the sampling solution form a characteristic red-violet color. The level of sulphur dioxide in the sample can then be determined by measuring the color intensity of the red-violet color.

Although the West-Gaeke type of reagents have been suitable for certain applications, their relatively high ultimate color intensity has made it difficult to achieve the desired level of the final color intensity in a short response period. Consequently, the conventional West-Gaeke type reagents have been not satisfactory for use in the extremely rapid-sensing continuous monitoring instruments being developed today. Moreover, the non-linear nature of the color development characteristic of the West-Gaeke type reagents has made it difficult to accurately calibrate the modern monitoring instruments. Also, the use of the West-Gaeke reagents results in color packets because the rate of color development does not appreciably lessen after the initial response period.

It is a primary object of this invention to provide an improved colorimetric reagent which is capable of detecting sulfur dioxide in a sampling solution with a rapid initial rate of color development, and yet with a relatively low final color intensity. A related object is to provide such a colorimetric reagent which is capable of achieving a relatively high percentage of its final color intensity in a short response period. Thus, it is an object of the invention to provide such a reagent which is capable of achieving approximately 90% of its three-minute color intensity within a one-minute response period.

It is another object of the present invention to provide an improved colorimetric reagent of the type described above which enables the instrument in which the reagent is used to be accurately calibrated. In this connection, it is another object of the invention to provide such a reagent which has substantially a linear color development characteristic.

A further object of this invention is to provide an improved colorimetric reagent of the type described above which minimizes the formation of color pockets in the instrument used. A related object is to provide such a reagent which has, after the rapid, initial rate, a relatively slow rate of color development.

Still another object of the invention is to provide an improved colorimetric reagent of the foregoing type which is stable over extended storage periods and which has good color stability, i.e., in which the developed color retains its intensity and does not fade for a period sufficiently long to permit accurate measuring and recording of the color intensity.

Other objects and advantages of this invention will become apparent upon reading the following detailed description and upon reference to the drawing, in which the single figure is a graph of color intensity plotted against time for two different colorimetric reagents, one of which embodies the present invention.

While the invention will be described in connection with certain preferred embodiments, it is to be understood that this invention is not intended to be limited to the particular embodiments disclosed but, on the contrary, it is intended to cover the various modifications and equivalent arrangements included within the spirit and scope of the appended claims.

When a West-Gaeke type colorimetric reagent is to be used for detecting the level of sulfur dioxide in an atmosphere sample, the sample is first passed through a scrubbing solution for the purpose of removing the sulfur dioxide. Distilled, demineralized water is an extremely efficient scrubber for the sulfur dioxide even at high flow rates, and is the preferred scrubbing solution when the colorimetric reagent of the present invention is to be used to measure the quantity of sulfur dioxide in an atmosphere sample. Other suitable scrubbing agents may be used, one of which is sodium tetrachloromercurate (II).

The conventional West-Gaeke type colorimetric reagents include pararosaniline hydrochloride as the dyestuff. Pararosaniline is bleached with hydrocholoric acid to form a solution which is pale yellow to colorless. The final ingredient of the reagent is formaldehyde.

In order to measure the level of sulfur dioxide in any given sample, the conventional West-Gaeke reagent is added to the sampling solution formed by the scrubbing solution so as to produce a characteristic red-violet color, and the intensity of this color is proportional to the level of sulfur dioxide in the original sample. The optimum concentrations of dyestuff, bleaching agent, and aldehyde in the West-Gaeke reagent are about 0.02 to 0.1% pararosaniline hydrochloride as the dyestuff, 6 to 12% concentrated hydrochloric acid as the bleaching agent, and 0.1 to 1.0% formaldehyde, all based on a liquid measure.

In accordance with the present invention, ethylene glycol is added to the conventional West-Gaeke reagent in order to produce an improved reagent which is suitable for use in the most modern rapid sensing continuous monitoring instrument. At least about 0.8 milliliter, preferably 0.8 to 1.2 milliliters, of ethylene glycol are added per liter of conventional reagents. It has been unexpectedly found that the resulting reagent containing only a minute portion of ethylene glycol provides a lower final color intensity that the conventional West-Gaeke reagents, and yet the color intensity of the inventive reagent after about one minute is essentially the same as that of the conventional West-Gaeke reagent. Consequently, a relatively high percentage of the final color intensity can be achieved in an extremely short response period. Moreover, after the initial response period, the color development characteristic of the inventive reagent is substantially linear so that the instrument in which the reagent is used can be accurately calibrated. The rate of color development after the initial one minute response period is also relatively slow, which has the advantage of minimizing the development of color pockets due to different stages of color development within the optical cells used to measure the color intensity within the instrument. The lower color intensity of the reagent provided by this invention also achieves a beneficial effect in that the reacted reagent will conform more closely to Beers law, with the attendant advantages being thereby realized.

The optimum formulation for the reagent of this invention is as follows:

8 milliliters pararosaniline hydrochloride solution (0.04%),
16 milliliters concentrated hydrochloric acid,
1.15 milliiters formaldehyde (37–40%).

The basic West-Gaeke reagent containing the above three ingredients is prepared by mixing 0.4 gram pararosaniline dihydrochloride in 3.6 milliliters of concentrated hydrochloric acid and diluting the resulting mixture to 100 millileters with distilled water To this is added 16 ml. of concentrated hydrochloric acid and 1.15 ml. of formaldehyde (37–40%). The resulting dilute mixture is then further diluted to one liter with distilled, demineralized water, and one milliletter of ethylene glycol is added to form the improved colorimetric reagent of this invention. Stated another way, an optimum formulation of the colorimetric reagent of this invention consists of, in liquid measure, the following:

2 parts concentrated hydrochloric acid as the bleaching agent,
1 part p-rosaniline hydrochloride (0.04%) as the dyestuff,
0.14 part formaldehyde (37 to 40%),
121.86 parts distilled water,
0.125 parts ethylene glycol.

A reagent having the above formulation not only affords the various advantages described above, but also provides improved wetting properties due to the amount of ethylene glycol employed. Whenever it is desired to utilize the ethylene glycol as a wetting agent, it should be present in an amount not less than about one milliliter per liter of the basic West-Gaeke reagent. It will be appreciated that other suitable wetting agents could also be used in the reagent of this invention, either alone or in combination with ethylene glycol, to provide the desired wetting properties.

In order to demonstrate the vastly superior performance of the reagent provided by this invention, a comparison of the West-Gaeke reagent with the improved colorimetric reagent of this invention was made. Nine liters of the optimum West-Gaeke formulation described above were made to serve as the West-Coast reagent, and a similar amount of the same formulation with nine millileters of ethylene glycol added, was made to serve as the improved colorimetric reagent of this invention. After having been scrubbed with distilled, demineralized water to form a sampling solution, the West-Gaeke reagent was added to one part of the sampling solution by passing it through a high speed colorimetric analyzer, and the color intensity of the resulting solution was measured and recorded at one minute intervals. The results of this test for the conventional West-Gaeke reagent are represented by curve 1 in the drawing. The same procedure was followed for the reagent of this invention, with the results being illustrated as curve 2 in the drawing.

With reference to the drawing, it can be seen that curve 1 has a very rapid rate of color development for the first minute, and the color then continues to develop at a relatively fast rate for the next few minutes until a relatively high final color intensity is achieved. Curve 2, illustrating the results utilizing the novel reagent of this invention, increases at substantially the same rate as curve 1 for the minute; and the color then continues to develop at a relatively slow rate until a final color intensity considerably lower than that of the West-Gaeke reagent is reached. Also, the color development characteristic of the reagent of the invention is substantially linear after the initial one minute response period, whereas the color development characteristic of the West-Gaeke reagent for the same time period is nonlinear.

As can be seen from the foregoing example, the improved colorimetric reagent of this invention provides a relatively low final intensity and yet the rate of color development during the initial one minute response period is extremely fast. Thus, a relatively high percentage of the color intensity or any intermediate intensity can be achieved in a short response period. For example, comparing curves 1 and 2 in the drawing, the West-Gaeke reagent achieves approximately 70% of its three-minute color intensity in the first minute, whereas the reagent of this invention achieves approximately 90% of its three minute intensity in the first minute. Consequently, the novel reagent of this invention is considerably more satisfactory for use in high speed monitoring instruments. The lower rate of color development exhibited by the reagent of this invention after the first minute results in a minimization of color pockets due to the different stages of color development within the optical cells used to measure the color intensity in the monitoring instrument. Moreover, the linear nature of the curve after the first minute of color development enables the instrument in which this reagent is used to be accurately calibrated. Furthermore, the lower ultimate color intensity of the reagent provides a beneficial effect in that the reagent conforms most closely to Beer's law.

This invention provides an improved colorimetric reagent which is capable of detecting sulfur dioxide in the air at levels as low as 0.25 part per hundred million with a rapid initial rate of color development in a short response period. Consequently, this reagent is especially useful in high speed continuous atmosphere monitors.

I claim as my invention:

1. In a West-Gaeke-type reagent for the colorimetric analysis of sulfur dioxide in air, said reagent comprising concentrated hydrochloric acid as the bleaching agent, p-rosaniline hydrochloride as the dyestuff, formaldehyde and a solvent, the improvement comprising ethylene glycol.

2. In a West-Kaeke-type reagent for the colorimetric analysis of sulfur dioxide in air, said reagent comprising concentrated hydrochloric acid as the bleaching agent, p-rosaniline hydrochloride as the dyestuff and formaldehyde, the improvement comprising ethylene glycol in an amount of about 0.8 to about 1.2 ml. of ethylene glycol per liter of solution of said reagent.

3. In a West-Gaeke-type reagent for the colorimetric analysis of sulfur dioxide in air, said reagent comprising concentrated hydrochloric acid as the bleaching agent, p-rosaniline hydrochloride as the dyestuff, formaldehyde and a solvent, the improvement comprising ethylene glycol present in an amount of at least about 0.8 ml. of ethylene glycol per liter of solution of said reagent.

4. In a West-Gaeke-type reagent for the colorimetric analysis of sulfur dioxide in air, said reagent comprising concentrated hydrochloric acid as the bleaching agent, p-rosaniline hydrochloride as the dyestuff and formaldehyde, the improvement comprising ethylene glycol present in an amount of about 1 ml. per liter of solution of said reagent.

5. In a West-Gaeke-type reagent for the colorimetric analysis of sulfur dioxide in air, said reagent comprising 16 milliliters of concentrated hydrochloric acid as the bleaching agent, 8 milliliters p-rosaniline hydrochloride (0.4%) as the dyestuff, 1.15 milliliters formaldehyde (37 to 40%) and 974.85 milliliters of distilled water, the improvement comprising 1.0 ml. of ethylene glycol per liter of said reagent.

6. In a colorimetric method for detecting the sulfur dioxide in air comprising the steps of contacting air with a scrubbing solution to isolate the sulfur dioxide from the air and form a sampling solution, adding said sampling solution to a West-Gaeke-type reagent comprising concentrated hydrochloric acid as the bleaching agent, p-rosaniline hydrochloride as the dyestuff, formaldehyde and a solvent and detecting the changes in the color of the reacted reagent, the improvement comprising adding ethylene glycol to the reagent.

7. In a colorimetric method for detecting sulfur dioxide in air comprising the steps of contacting air with a scrubbing solution to isolate the sulfur dioxide from the air and form a sampling solution, adding said sampling solution to a West-Gaeke-type reagent comprising concentrated hydrochloric acid as the bleaching agent, p-rosaniline hydrochloride as the dyestuff, formaldehyde and a solvent and detecting the changes in color of the reacted reagent, the improvement comprising adding ethylene glycol to the reagent in an amount of at least about 0.8 ml. ethylene glycol per liter of the reagent.

8. In a colorimetric method for detecting sulfur dioxide in air comprising the steps of contacting air with a scrubbing solution to isolate the sulfur dioxide from the air and form a sampling solution, adding said sampling solution to a West-Gaeke-type reagent comprising concentrated hydrochloric acid as the bleaching agent, p-rosaniline hydrochloride as the dyestuff, formaldehyde and distilled, demineralized water and detecting the changes in the color of the reacted reagent, the improvement comprising adding to the reagent ethylene glycol in an amount from about 0.8 ml. to about 1.2 ml. ethylene glycol per liter of the reagent.

9. In a colorimetric method for detecting sulfur dioxide in air comprising the steps of contacting air with a scrubbing solution to isolate the sulfur dioxide from the air and form a sampling solution, adding said sampling solution to a West-Gaeke-type reagent consisting essentially of concentrated hydrochloric acid as the bleaching agent, p-rosaniline hydrochloride as the dyestuff, formaldehyde and distilled, demineralized water, and detecting the changes in the color of the reacted reagent, the improvement comprising adding ethylene glycol to the reagent in an amount of about 1 ml. ethylene glycol per liter of the reagent.

References Cited

West, P. W., and Gaeke, G. C., Analytical chemistry, pp. 1816–19.

DARRELL L. CLAY, *Primary Examiner.*

T. J. KOZMA, *Assistant Examiner.*

U.S. Cl. X.R.

23—230; 252—408